United States Patent
Huang et al.

(10) Patent No.: US 7,952,818 B1
(45) Date of Patent: May 31, 2011

(54) OPTICAL IMAGING LENS ASSEMBLY

(75) Inventors: Hsin Hsuan Huang, Taichung (TW); Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/957,862

(22) Filed: Dec. 1, 2010

(30) Foreign Application Priority Data

Sep. 15, 2010 (TW) .............................. 99131293 A

(51) Int. Cl.
*G02B 9/34* (2006.01)
*G02B 3/02* (2006.01)
(52) U.S. Cl. .................................. 359/772; 359/715
(58) Field of Classification Search .............. 359/715, 359/771, 772, 773, 774, 780
See application file for complete search history.

(56) References Cited

U.S. PATENT DOCUMENTS 7,365,920 B2    4/2008   Noda

*Primary Examiner* — Jack Dinh
(74) *Attorney, Agent, or Firm* — Tim Tingkang Xia; Morris, Manning & Martin, LLP

(57) ABSTRACT

The present invention provides an optical imaging lens assembly comprising, in order from an object side to an image side: a first lens element with positive refractive power having a convex object-side surface; a second lens element having a concave object-side surface; a third lens element with positive refractive power; a fourth lens element having a convex object-side surface and a concave image-side surface; a first stop disposed between the first lens element and the second lens element; and a second stop disposed between the second lens element and the fourth lens element. Such an arrangement of optical elements can effectively reduce the total track length of the lens assembly, lower the sensitivity of the optical system, and obtain good image quality.

16 Claims, 10 Drawing Sheets

| TABLE 1 | | | | | | | |
|---|---|---|---|---|---|---|---|
| (Embodiment 1) | | | | | | | |
| f = 4.73 mm, Fno = 2.80, HFOV = 30.0 deg. | | | | | | | |
| Surface # | | Curvature Radius | Thickness | Material | Index | Abbe # | Focal length |
| 0 | Object | Plano | Infinity | | | | |
| 1 | Lens 1 | 2.412069 (ASP) | 0.826 | Glass | 1.592 | 68.3 | 4.53 |
| 2 | | 20.975876 (ASP) | 0.100 | | | | |
| 3 | Ape. Stop | Plano | 1.195 | | | | |
| 4 | Lens 2 | -2.264112 (ASP) | 0.580 | Plastic | 1.606 | 26.6 | -4.31 |
| 5 | | -18.681933 (ASP) | 0.051 | | | | |
| 6 | Stop 2 | Plano | 0.050 | | | | |
| 7 | Lens 3 | 2.699842 (ASP) | 0.771 | Plastic | 1.510 | 56.2 | 7.93 |
| 8 | | 7.337102 (ASP) | 0.174 | | | | |
| 9 | Stop 3 | Plano | 0.000 | | | | |
| 10 | Lens 4 | 1.493741 (ASP) | 0.864 | Plastic | 1.510 | 56.2 | 18.72 |
| 11 | | 1.424654 (ASP) | 0.700 | | | | |
| 12 | IR-filter | Plano | 0.300 | Glass | 1.516 | 64.1 | - |
| 13 | | Plano | 0.308 | | | | |
| 14 | Image | Plano | - | | | | |
| Note: One half of aperture diameter of Stop 1 at surface #6 is 1.56mm(YS) | | | | | | | |
| One half of aperture diameter of Stop 2 at surface #9 is 2.13mm(YS) | | | | | | | |

Fig.3

| TABLE 2 | | | | |
|---|---|---|---|---|
| Aspheric Coefficients | | | | |
| Surface # | 1 | 2 | 4 | 5 |
| k    = | 1.17046E+00 | -1.04432E+02 | 1.02189E+00 | 1.86603E+01 |
| A3 = | -7.36272E-03 | -7.82192E-03 | -1.03759E-02 | -1.40655E-01 |
| A4 = | 1.03527E-02 | 8.61467E-03 | -1.61210E-01 | -1.32687E-01 |
| A5 = | -5.22210E-02 | -3.27520E-02 | 2.09585E-01 | 1.96427E-01 |
| A6 = | 2.39185E-02 | -1.02509E-03 | 3.03302E-02 | 2.73596E-03 |
| A7 = | 1.16688E-02 | 3.25194E-02 | -1.14718E-01 | -5.52094E-02 |
| A8 = | -2.10944E-03 | -2.34484E-03 | -4.33395E-02 | -8.36517E-03 |
| A9 = | -2.65223E-02 | -7.80003E-02 | 9.61446E-02 | 1.97545E-02 |
| A10= | 1.23768E-02 | 5.82167E-02 | -2.55990E-02 | -2.50155E-03 |
| Surface # | 7 | 8 | 10 | 11 |
| k    = | -9.02760E+00 | -1.12364E+02 | -9.47970E+00 | -5.71249E+00 |
| A3 = | -1.26306E-01 | 4.27763E-02 | 9.58266E-02 | 4.87494E-02 |
| A4 = | 1.01718E-01 | -8.22634E-03 | -9.48010E-02 | -7.67564E-02 |
| A5 = | 1.35866E-02 | -7.99893E-03 | -6.70583E-03 | 3.12870E-02 |
| A6 = | -1.77640E-02 | 2.26421E-04 | 5.76666E-03 | -8.39256E-03 |
| A7 = | -1.82468E-02 | -1.51705E-03 | 5.46640E-03 | -2.01369E-03 |
| A8 = | 2.16832E-03 | -4.09357E-04 | -1.16494E-03 | 1.28284E-03 |
| A9 = | 9.67772E-03 | 1.04798E-03 | -2.49258E-04 | 2.59338E-04 |
| A10= | -3.57534E-03 | -3.52216E-04 | 4.84927E-05 | -1.16134E-04 |

Fig.4

| TABLE 3 | | | | | | | |
|---|---|---|---|---|---|---|---|
| (Embodiment 2) | | | | | | | |
| f = 4.87 mm, Fno = 2.80, HFOV = 30.0 deg. | | | | | | | |
| Surface # | | Curvature Radius | Thickness | Material | Index | Abbe # | Focal length |
| 0 | Object | Plano | Infinity | | | | |
| 1 | Lens 1 | 1.841948 (ASP) | 0.713 | Glass | 1.471 | 76.6 | 5.13 |
| 2 | | 6.785271 (ASP) | 0.187 | | | | |
| 3 | Ape. Stop | Plano | 1.593 | | | | |
| 4 | Lens 2 | -1.974376 (ASP) | 0.399 | Plastic | 1.604 | 27.2 | -5.50 |
| 5 | | -5.240007 (ASP) | -0.250 | | | | |
| 6 | Stop 2 | Plano | 0.350 | | | | |
| 7 | Lens 3 | 3.529525 (ASP) | 0.585 | Plastic | 1.510 | 56.2 | 10.81 |
| 8 | | 9.265345 (ASP) | 0.190 | | | | |
| 9 | Lens 4 | 1.267493 (ASP) | 0.813 | Plastic | 1.510 | 56.2 | 14.52 |
| 10 | | 1.197703 (ASP) | 0.700 | | | | |
| 11 | IR-filter | Plano | 0.300 | Glass | 1.516 | 64.1 | - |
| 12 | | Plano | 0.318 | | | | |
| 13 | Image | Plano | - | | | | |
| Note: One half of aperture diameter of Stop 1 at surface #6 is 1.63mm(YS) | | | | | | | |

Fig.5

| TABLE 4 | | | | |
|---|---|---|---|---|
| Aspheric Coefficients | | | | |
| Surface # | 1 | 2 | 4 | 5 |
| k = | 9.34337E-01 | -1.89785E+00 | 1.09325E+00 | 2.20508E+00 |
| A3 = | -1.02926E-02 | -4.69537E-03 | -5.22379E-02 | -2.03639E-01 |
| A4 = | 1.69110E-02 | 2.91213E-02 | -1.89238E-01 | -1.57655E-01 |
| A5 = | -5.05096E-02 | -1.17101E-02 | 1.58744E-01 | 1.96111E-01 |
| A6 = | 2.18847E-02 | -1.49513E-02 | 2.16376E-02 | -1.44887E-03 |
| A7 = | 1.11276E-02 | 4.24642E-02 | -1.02616E-01 | -6.07964E-02 |
| A8 = | 6.97739E-04 | 2.47441E-03 | -3.51050E-02 | -1.11092E-02 |
| A9 = | -2.40045E-02 | -7.67962E-02 | 9.64970E-02 | 1.98881E-02 |
| A10= | 8.77919E-03 | 5.90600E-02 | -2.99738E-02 | -7.01527E-04 |
| Surface # | 7 | 8 | 9 | 10 |
| k = | -5.03375E+00 | -2.23635E+01 | -6.69952E+00 | -5.31620E+00 |
| A3 = | -1.27853E-01 | 7.00780E-02 | 1.09225E-01 | 5.62343E-02 |
| A4 = | 1.05750E-01 | -9.95187E-03 | -9.41731E-02 | -8.22223E-02 |
| A5 = | 1.44953E-02 | -9.30442E-03 | -7.13981E-03 | 2.99879E-02 |
| A6 = | -1.74555E-02 | -2.53833E-04 | 5.50726E-03 | -8.35096E-03 |
| A7 = | -1.87906E-02 | -1.47310E-03 | 5.37498E-03 | -1.85629E-03 |
| A8 = | 1.69754E-03 | -3.31970E-04 | -1.18276E-03 | 1.35845E-03 |
| A9 = | 9.57381E-03 | 1.07931E-03 | -2.49224E-04 | 2.75421E-04 |
| A10= | -3.29383E-03 | -3.35768E-04 | 5.34671E-05 | -1.19034E-04 |

Fig.6

| TABLE 5 | | | |
|---|---|---|---|
| | | Embodiment 1 | Embodiment 2 |
| f | | 4.73 | 4.87 |
| Fno | | 2.80 | 2.80 |
| HFOV | | 30.0 | 30.0 |
| CT3/CT4 | | 0.89 | 0.72 |
| T12/f | | 0.27 | 0.37 |
| R5/R6 | | 0.37 | 0.38 |
| (R7-R8)*10/(R7+R8) | | 0.24 | 0.28 |
| f/f1 | | 1.04 | 0.95 |
| f1/f2 | | -1.05 | -0.93 |
| (ImgH-0.7LS)/ImgH | Stop 2 | 0.20 | 0.21 |
| | Stop 3 | 0.46 | - |
| YS/ImgH | Stop 2 | 0.58 | 0.58 |
| | Stop 3 | 0.79 | - |
| DS/DL | Stop 2 | 0.43 | 0.14 |
| | Stop 3 | 0.52 | - |
| TTL/f | | 1.23 | 1.19 |
| TTL/ImgH | | 2.17 | 2.08 |

OPTICAL IMAGING LENS ASSEMBLY

CROSS-REFERENCE TO RELATED APPLICATIONS

This non-provisional application claims priority under 35 U.S.C. §119(a) on Patent Application No(s). 099131293 filed in Taiwan, R.O.C. on Sep. 15, 2010, the entire contents of which are hereby incorporated by reference.

BACKGROUND OF THE INVENTION

1. Field of the Invention

The present invention relates to an optical imaging lens assembly, and especially in a compact optical imaging lens assembly used in a portable electronic product.

2. Description of the Prior Art

In recent years, due to the popularity of compact photographing lens assembly, the demand for compact imaging modules is increasing, and the sensor of a general photographing camera is none other than CCD (Charge-Coupled Device) or CMOS device (Complementary Metal-Oxide Semiconductor Device). The pixel size of sensor component is reducing because of the advances in semiconductor manufacturing technology; meanwhile, electronic products are becoming more and more powerful yet featuring a compact design. Therefore, there is an increasing demand for better image quality of compact imaging lens assembly.

A conventional high-resolution imaging lens assembly generally adopts a lens assembly comprising four lens elements with a stop disposed at the front, wherein the first and second lens elements are mostly spherical glass lenses which are adhered together to from a doublet for correcting chromatic aberrations. The lens assembly disclosed in U.S. Pat. No. 7,365,920 serves as one such example; however, this kind of arrangement has the following disadvantages. First, the degree of freedom in arranging the lens system is curtailed due to the employment of excess number of spherical glass lenses; thus, the total track length of the system cannot be reduced easily. Second, the process of adhering glass lenses together is complicated, posing difficulties in manufacture. Moreover, as the size of imaging lens assembly is becoming smaller, assembling lens elements compactly within a limited space tends to cause unnecessary light rays which reflect too many times within a lens barrel that will affect image quality. Thus, to improve image quality, it is important to prevent unnecessary light rays from entering the image forming area.

Therefore, a need exists in the art for an optical imaging lens assembly applicable to compact, portable electronic products, wherein the lens assembly features better image quality, maintains a moderate total track length and has lower sensitivity of an optical system.

SUMMARY OF THE INVENTION

The present invention provides an optical imaging lens assembly comprising, in order from an object side to an image side: a first lens element with positive refractive power having a convex object-side surface; a second lens element having a concave object-side surface; a third lens element with positive refractive power; a fourth lens element having a convex object-side surface and a concave image-side surface; a first stop disposed between the first lens element and the second lens element; and a second stop disposed between the second lens element and the fourth lens element, wherein the lens assembly is further provided with an electronic sensor for the image formation of an object; a focal length of the first lens element is f1; a focal length of the second lens element is f2; half of a diameter of the second stop is YS; half of a diagonal length of an effective pixel area of the electronic sensor is ImgH; a distance on an optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; a distance on the optical axis between the object-side surface of the first lens element and the electronic sensor is TTL; and they satisfy the following relations: $f1/f2<0$; $0.30<YS/ImgH<0.85$; $-0.3<DS/DL<0.7$; $0.21<T12/f<0.38$; and $0.30<TTL/f<1.29$.

Moreover, the present invention provides an optical imaging lens assembly comprising, in order from an object side to an image side: a first lens element with positive refractive power having a convex object-side surface; a second lens element having a concave object-side surface; a third lens element with positive refractive power, at least one of the object-side and image-side surfaces thereof being aspheric; a fourth lens element having a convex object-side surface and a concave image-side surface, at least one of the object-side and image-side surfaces thereof being aspheric, and at least one inflection point being formed on at least one of the object-side and image-side surfaces; a first stop disposed between the first lens element and the second lens element; a second stop disposed between the second lens element and the third lens element, wherein the lens assembly is further provided with an electronic sensor for the image formation of an object; a focal length of the first lens element is f1; a focal length of the second lens element is f2; a distance on the optical axis between the second stop and the electronic sensor is LS; half of a diameter of the second stop is YS; half of a diagonal length of an effective pixel area of the electronic sensor is ImgH; a distance on the optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; a distance on the optical axis between the object-side surface of the first lens element and the electronic sensor is TTL; and they satisfy the following relations: $f1/f2<0$; $(ImgH-0.7LS)/ImgH<YS/ImgH<0.82$; $-0.3<DS/DL<0.7$; $0.21<T12/f<0.38$; and $0.30<TTL/f<1.29$.

Such arrangements of optical elements can effectively reduce the total track length of the lens assembly, lower the sensitivity of the optical system, and obtain good image quality.

In an optical imaging lens assembly of the present invention, the first lens element with positive refractive power provides the main refractive power of the system; this allows the total track length of the system to be favorably reduced. When the second lens element has negative refractive power, the aberration produced by the first lens element with positive refractive power can be effectively corrected, and the chromatic aberration of system can also be favorably corrected. The third lens element with positive refractive power effectively distributes the refractive power of the first lens element, thereby reducing the sensitivity of the system. The fourth lens element may have positive or negative refractive power. When the fourth lens element has positive refractive power, the refractive power of the system can be favorably distributed, thereby reducing the sensitivity of the lens assembly. When the fourth lens element has negative refractive power, the principal point of the optical system can be placed away from the image plane, thereby reducing the total track length of the system favorably and maintaining a compact lens assembly.

In the optical imaging lens assembly of present invention, the first lens element may be a bi-convex lens element or a meniscus lens element having a convex object-side surface and a concave image-side surface. When the first lens element is a bi-convex lens element, the refractive power thereof can be favorably distributed, thereby further reducing the total track length of the lens assembly. When the first lens element is a meniscus lens element, the astigmatism of system can be favorably corrected, thereby improving image quality of the system. The second lens element has a concave object-side surface and may have a convex or concave image-side surface. When the second lens element is a meniscus lens element having a concave object-side surface and a convex image-side surface, the aberration produced by the first lens element can be favorable corrected, and the refractive power of the second lens element can be effectively controlled; as a result, the sensitivity of the system can be reduced. When the second lens element is a bi-concave lens element, its negative refractive power can be effectively increased, thereby correcting chromatic aberrations of the system favorably. The fourth lens element is a meniscus lens element having a convex object-side surface and a concave image-side surface; this allows the astigmatism and the high-order aberration of system to be favorably corrected.

In an optical imaging lens assembly of the present invention, the first stop is disposed between the first lens element and the second lens element. With such an arrangement, the sensitivity of the system can be favorably reduced and the telecentric feature on the image side of the system can be maintained. Preferably, the first stop is an aperture stop.

BRIEF DESCRIPTION OF THE DRAWINGS

FIG. 3 is TABLE 1 which lists the optical data of the first embodiment.

FIG. 4 is TABLE 2 which lists the aspheric surface data of the first embodiment.

FIG. 5 is TABLE 3 which lists the optical data of the second embodiment.

FIG. 6 is TABLE 4 which lists the aspheric surface data of the second embodiment.

FIG. 7 is TABLE 5 which lists the data of the respective embodiments resulting from the equations.

DETAILED DESCRIPTION OF THE PREFERRED EMBODIMENTS

Figure 1A:
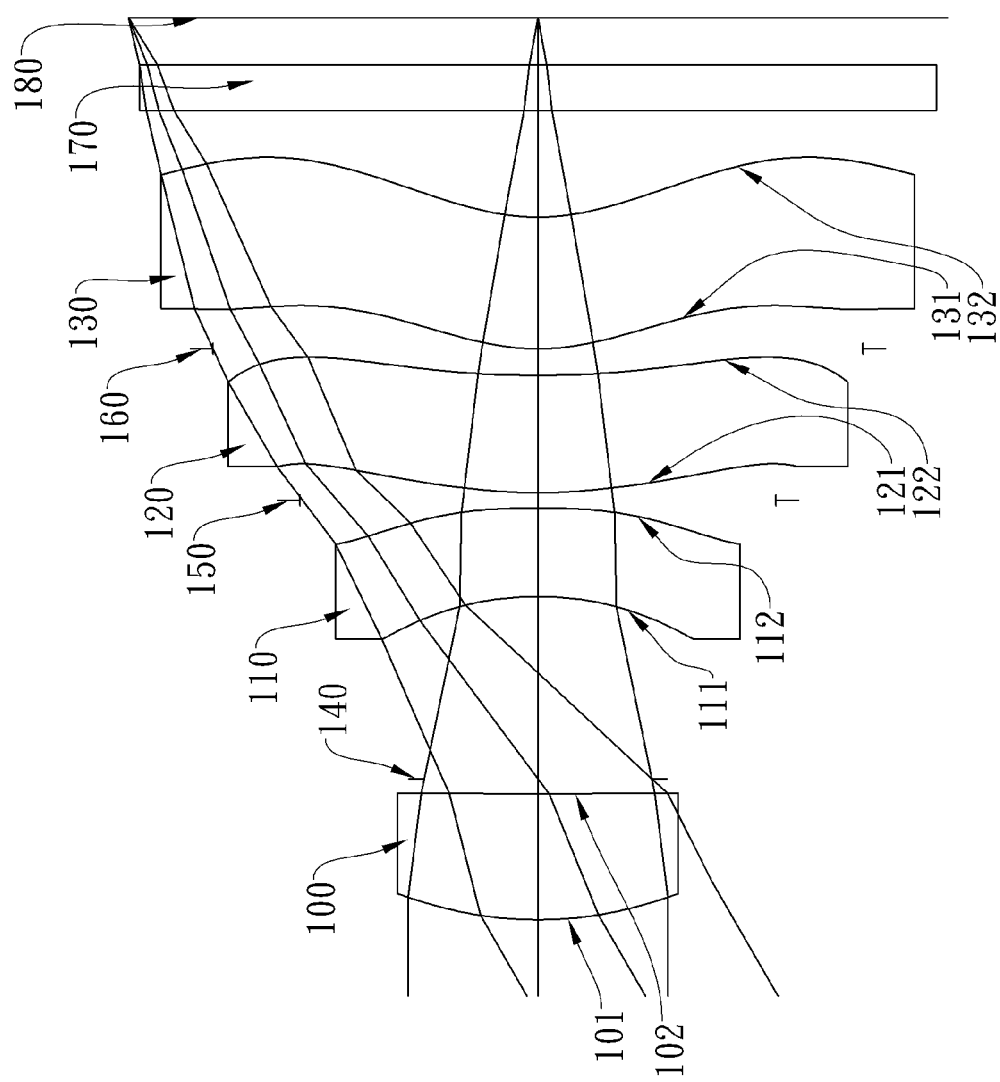
FIG. 1A shows an optical imaging lens assembly in accordance with a first embodiment of the present invention.

The present invention provides an optical imaging lens assembly comprising, in order from an object side to an image side: a first lens element with positive refractive power having a convex object-side surface; a second lens element having a concave object-side surface; a third lens element with positive refractive power; a fourth lens element having a convex object-side surface and a concave image-side surface; a first stop disposed between the first lens element and the second lens element; a second stop disposed between the second lens element and the fourth lens element, wherein the lens assembly is further provided with an electronic sensor for the image formation of an object; a focal length of the first lens element is f1; a focal length of the second lens element is f2; half of a diameter of the second stop is YS; half of a diagonal length of an effective pixel area of the electronic sensor is ImgH; a distance on an optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; a distance on the optical axis between the object-side surface of the first lens element and the electronic sensor is TTL; and they satisfy the following relations: f1/f2<0; 0.30<YS/ImgH<0.85; −0.3<DS/DL<0.7; 0.21<T12/f<0.38; and 0.30<TTL/f<1.29.

When the relation of f1/f2<0 is satisfied, the first lens element and the second lens element will be a combination of one positive and one negative refractive power. This allows the chromatic aberration of the system to be favorably corrected, and the total track length of the lens assembly to be effectively reduced; preferably, the following relation is satisfied: −1.3<f1/f2<−0.6.

When the relation of 0.30<YS/ImgH<0.85 is satisfied, the diameter of the second stop can be effectively controlled. This feature is advantageous in cutting off unnecessary light rays around the outer area of the lens assembly, thereby improving image quality of the system; moreover, relative illuminance of the system will not be too low. Preferably, the following relation is satisfied: 0.53<YS/ImgH<0.82.

When the relation of −0.3<DS/DL<0.7 is satisfied, the relative position and distance between the second stop and its adjacent lens element can be effectively controlled, which is favorable for the assembling of the lens elements. Preferably, the following relation is satisfied: −0.1<DS/DL<0.62.

When the relation of 0.21<T12/f<0.38 is satisfied, the high-order aberration of the lens assembly can be favorably corrected, and the lens elements of the system are arranged in a more balanced degree. This allows the total track length of the system to be reduced, thereby keeping the lens assembly compact.

When the relation of 0.30<TTL/f<1.29 is satisfied, the total track length of the lens assembly can be effectively controlled, thereby keeping the system compact favorably.

In the aforementioned optical imaging lens assembly, the focal length of the lens assembly is f, the focal length of the first lens element is f1, and preferably, they satisfy the following relation: 0.7<f/f1<1.4. When this relation is satisfied, the refractive power of the first lens element can be distributed in a more balanced degree; this allows the total track length of the system to be effectively controlled so as to remain compact, and also prevents the high order spherical aberration from increasing excessively, thereby improving image quality of the system. Further preferably, the following relation is satisfied: 0.9<f/f1<1.1.

In the aforementioned optical imaging lens assembly, the radius of curvature of the object-side surface of the fourth lens element is R7, the radius of curvature of the image-side surface of the fourth lens element is R8, and preferably, they satisfy the following relation: $0.2<(R7-R8)*10/(R7+R8)<0.6$. When this relation is satisfied, the fourth lens element will be a meniscus lens element that can favorably correct the astigmatism produced by the system.

In the aforementioned optical imaging lens assembly, the radius of curvature of the object-side surface of the third lens element is R5, the radius of curvature of the image-side surface of the third lens element is R6, and preferably, they satisfy the following relation: $0.3<R5/R6<0.4$. When this relation is satisfied, the spherical aberration of system can be favorably corrected.

In the aforementioned optical imaging lens assembly, the thickness of the third lens element on the optical axis is CT3, the thickness of the fourth lens element on the optical axis is CT4, and preferably, they satisfy the following relation: $0.65<CT3/CT4<0.95$. When this relation is satisfied, the lens elements are arranged more appropriately in the lens assembly; as a result, plastic lens elements can be formed more easily and have the higher homogeneity during the injection molding process, and the lens assembly can achieve better image quality.

In the aforementioned optical imaging lens assembly, the distance on the optical axis between the object-side surface of the first lens element and the electronic sensor is TTL, half of the diagonal length of the effective pixel area of the electronic sensor is ImgH, and preferably, they satisfy the following relation: $TTL/ImgH<2.2$. When this relation is satisfied, the lens assembly can remain compact which is favorable for the installation into a compact and portable electronic product.

Moreover, the present invention provides an optical imaging lens assembly comprising, in order from an object side to an image side: a first lens element with positive refractive power having a convex object-side surface; a second lens element having a concave object-side surface; a third lens element with positive refractive power, at least one of the object-side and image-side surfaces thereof being aspheric; a fourth lens element having a convex object-side surface and a concave image-side surface, at least one of the object-side and image-side surfaces thereof being aspheric, and at least one inflection point being formed on at least one of the object-side and image-side surfaces thereof; a first stop disposed between the first lens element and the second lens element; a second stop disposed between the second lens element and the third lens element, wherein the lens assembly is further provided with an electronic sensor for the image formation of an object; a focal length of the first lens element is f1; a focal length of the second lens element is f2; a distance on an optical axis between the second stop and the electronic sensor is LS; half of a diameter of the second stop is YS; half of a diagonal length of an effective pixel area of the electronic sensor is ImgH; a distance on an optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; a distance on the optical axis between the object-side surface of the first lens element and the electronic sensor is TTL; and they satisfy the following relations: $f1/f2<0$; $(ImgH-0.7LS)/ImgH<YS/ImgH<0.82$; $-0.3<DS/DL<0.7$; $0.21<T12/f<0.38$; and $0.30<TTL/f<1.29$.

When the relation of $f1/f2<0$ is satisfied, the first lens element and the second lens element will be a combination of one positive and one negative lens elements. This allows the chromatic aberration of the system to be favorably corrected and the total track length of the lens assembly to be effectively reduced; preferably, the following relation is satisfied: $-1.3<f1/f2<-0.6$.

When the relation of $(ImgH-0.7LS)/ImgH<YS/ImgH<0.82$ is satisfied, the diameter of the second stop can be effectively controlled. This feature is advantageous in cutting off unnecessary light rays around the outer area of the lens assembly, thereby improving image quality of the system; moreover, relative illuminance of the system will not be too low. Preferably, the following relation is satisfied: $0.5<YS/ImgH<0.7$.

When the relation of $-0.3<DS/DL<0.7$ is satisfied, the relative positions and distance between the second stop and its adjacent lens element can be effectively controlled, which is favorable for the assembling of the lens elements.

When the relation of $0.21<T12/f<0.38$ is satisfied, the high-order aberration of the lens assembly can be favorably corrected, and the lens elements of the system are arranged in a more balanced degree. This allows the total track length of the system to be favorably reduced, thereby keeping the lens assembly compact.

When the relation of $0.30<TTL/f<1.29$ is satisfied, the total track length of the lens assembly can be effectively controlled, thereby keeping the system compact favorably.

In the aforementioned optical imaging lens assembly, the radius of curvature of the object-side surface of the third lens element is R5, the radius of curvature of the image-side surface of the third lens element is R6, and preferably, they satisfy the following relation: $0.3<R5/R6<0.4$. When this relation is satisfied, the spherical aberration of the system can be favorably corrected.

In an optical imaging lens assembly of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce the aberration and the total number of the lens element, so that the total track length of the lens assembly can be reduced effectively.

In an optical imaging lens assembly of the present invention, if a lens element has a convex surface, it means the portion of the surface in proximity to the axis is convex; if a lens element has a concave surface, it means the portion of the surface in proximity to the axis is concave.

Figure 8:
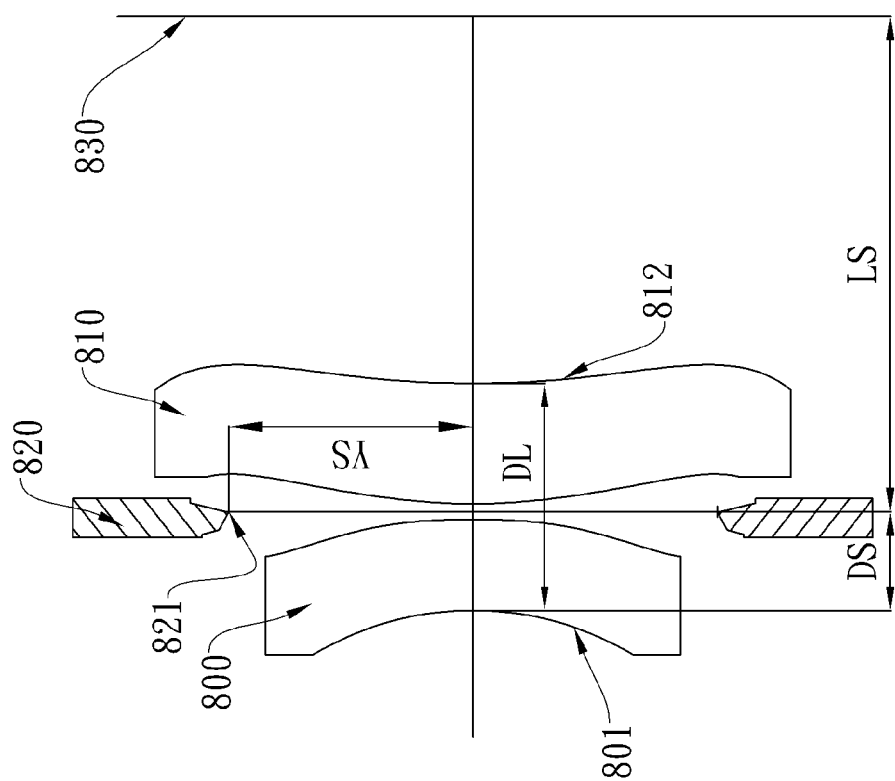
FIG. 8 is a schematic view illustrating the distances that LS, YS, DS, DL represent and their relative positions.

In an optical imaging lens assembly of the present invention, the stop is a light-shielding component that can shield off part of the light rays incident on the system, so that focusing ability of the system can be improved; moreover, the stop will not cause relative illuminance of the system to become too low. The position of the stop is defined as a position in the lens assembly where the stop has the smallest diameter and can affect the actual light path. FIG. 8 illustrates the distances that LS, YS, DS, DL represent and their relative positions. The stop 820 is a substance with thickness. The position of the stop 820 is a position where it has the smallest diameter and can affect the actual light path, i.e., the position 821. The distance on the optical axis between the stop 820 and the electronic sensor 830 is LS. Half of the diameter of the stop 820 is YS, as the distance from the position 821 to the optical axis. The distance on the optical axis between the stop 820 and the object-side surface 801 of the adjacent lens element 800 which is relative to the object side of the stop 820 is DS. DL is the distance on the optical axis between the object-side surface 801 of the adjacent lens element 800 which is relative to the object side of the stop 820 and the image-side surface 812 of the adjacent lens element 810 which is relative to the image side of the stop 820.

Preferred embodiments of the present invention will be described in the following paragraphs by referring to the accompanying drawings.

Figure 1B:
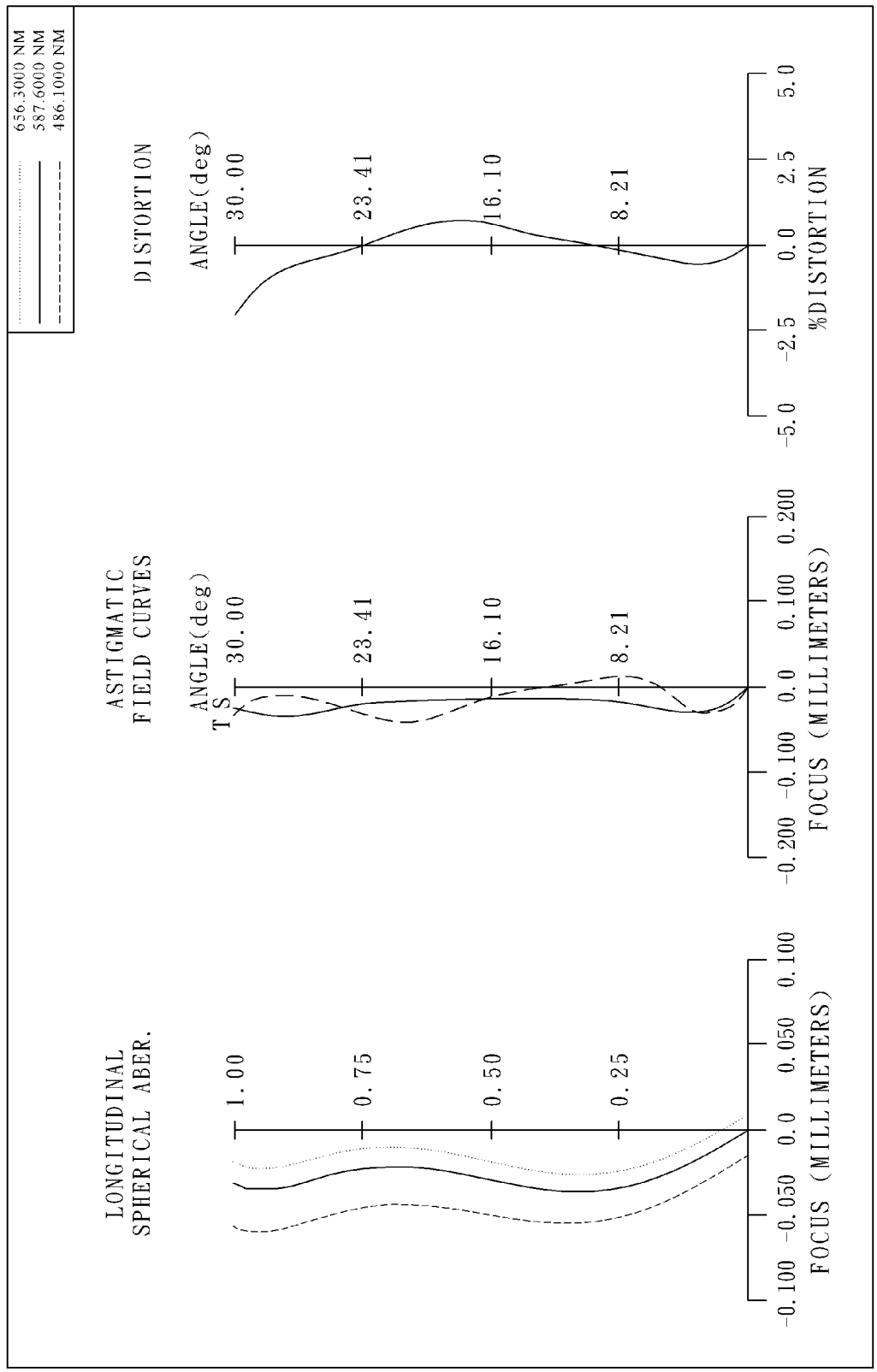
FIG. 1B shows the aberration curves of the first embodiment of the present invention.

FIG. 1A shows an optical imaging lens assembly in accordance with a first embodiment of the present invention, and FIG. 1B shows the aberration curves of the first embodiment of present invention. The optical imaging lens assembly in the first embodiment mainly comprises four lens elements, in order from an object side to an image side: a glass first lens element 100 with positive refractive power having a convex object-side surface 101 and a concave image-side surface 102, both of the surfaces 101 and 102 being aspheric; a plastic second lens element 110 with negative refractive power having a concave object-side surface 111 and a convex image-side surface 112, both of the surfaces 111 and 112 being aspheric; a plastic third lens element 120 with positive refractive power having a convex object-side surface 121 and a concave image-side surface 122, both of the surfaces 121 and 122 being aspheric; a plastic fourth lens element 130 with positive refractive power having a convex object-side surface 131 and a concave image-side surface 132, both of the surfaces 131 and 132 being aspheric and at least one inflection point being formed on each of the surfaces 131 and 132; an aperture stop 140 disposed between the first lens element 100 and the second lens element 110; a second stop 150 disposed between the second lens element 110 and the third lens element 120; a third stop 160 disposed between the third lens element 120 and the fourth lens element 130. The optical imaging lens assembly also comprises an IR-filter 170 disposed between the image-side surface 132 of the fourth lens element 130 and an image plane 180; the IR-filter 170 is made of glass and has no influence on the focal length of the lens assembly. Further, the optical imaging lens assembly is provided with an electronic sensor disposed at the image plane 180 for the image formation of an object.

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens assembly, the focal length of the lens assembly is f, and it satisfies the relation: f=4.73 (mm).

In the first embodiment of the present optical imaging lens assembly, the f-number of the lens assembly is Fno, and it satisfies the relation: Fno=2.80.

In the first embodiment of the present optical imaging lens assembly, half of the maximum field of view of the lens assembly is HFOV, and it satisfies the relation: HFOV=30.0 (degrees).

In the first embodiment of the present optical imaging lens assembly, the thickness of the third lens element 120 on the optical axis is CT3, the thickness of the fourth lens element 130 on the optical axis is CT4, and they satisfy the relation: CT3/CT4=0.89.

In the first embodiment of the present optical imaging lens assembly, the distance on the optical axis between the first lens element 100 and the second lens element 110 is T12, the focal length of the lens assembly is f, and they satisfy the relation: T12/f=0.27.

In the first embodiment of the present optical imaging lens assembly, the radius of curvature of the object-side surface 121 of the third lens element 120 is R5, the radius of curvature of the image-side surface 122 of the third lens element 120 is R6, and they satisfy the relation: R5/R6=0.37.

In the first embodiment of the present optical imaging lens assembly, the radius of curvature of the object-side surface 131 of the fourth lens element 130 is R7, the radius of curvature of the image-side surface 132 of the fourth lens element 130 is R8, and they satisfy the relation: (R7−R8)*10/(R7+R8)=0.24.

In the first embodiment of the present optical imaging lens assembly, the focal length of the lens assembly is f, the focal length of the first lens element 100 is f1, and they satisfy the relation: f/f1=1.04.

In the first embodiment of the present optical imaging lens assembly, the focal length of the first lens element 100 is f1, the focal length of the second lens element 110 is f2, and they satisfy the relation: f1/f2=−1.05.

In the first embodiment of the present optical imaging lens assembly, the distance on the optical axis between the second stop 150 and the electronic sensor is $LS_2$, half of the diagonal length of the effective pixel area of the electronic sensor is ImgH, and they satisfy the relation: $(ImgH-0.7LS_2)/ImgH=0.20$.

In the first embodiment of the present optical imaging lens assembly, the distance on the optical axis between the third stop 160 and the electronic sensor is $LS_3$, half of the diagonal length of the effective pixel area of the electronic sensor is ImgH, and they satisfy the relation: $(ImgH-0.7LS_3)/ImgH=0.46$.

In the first embodiment of the present optical imaging lens assembly, half of the diameter of the second stop 150 is $YS_2$, half of the diagonal length of the effective pixel area of the electronic sensor is ImgH, and they satisfy the relation: $YS_2/ImgH=0.58$.

In the first embodiment of the present optical imaging lens assembly, half of the diameter of the third stop 160 is $YS_3$, half of the diagonal length of the effective pixel area of the electronic sensor is ImgH, and they satisfy the relation: $YS_3/ImgH=0.79$.

In the first embodiment of the present optical imaging lens assembly, the distance on the optical axis between the object-side surface 111 of the second lens element 110 and the second stop 150 is $DS_2$, the distance on the optical axis between the object-side surface 111 of the second lens element 110 and the image-side surface 122 of the third lens element 120 is $DL_2$, and they satisfy the relation: $DS_2/DL_2=0.43$.

In the first embodiment of the present optical imaging lens assembly, the distance on the optical axis between the object-side surface 121 of the third lens element 120 and the third stop 160 is $DS_3$, the distance on the optical axis between the object-side surface 121 of the third lens element 120 and the image-side surface 132 of the fourth lens element 130 is $DL_3$, and they satisfy the relation: $DS_3/DL_3=0.52$.

In the first embodiment of the present optical imaging lens assembly, the distance on the optical axis between the object-side surface 101 of the first lens element 100 and the electronic sensor is TTL, the focal length of the lens assembly is f, and they satisfy the relation: TTL/f=1.23.

In the first embodiment of the present optical imaging lens assembly, the distance on the optical axis between the object-side surface 101 of the first lens element 100 and the electronic sensor is TTL, half of the diagonal length of the effective pixel area of the electronic sensor is ImgH, and they satisfy the relation: TTL/ImgH=2.17.

The detailed optical data of the first embodiment is shown in FIG. 3 (TABLE 1), and the aspheric surface data is shown in FIG. 4 (TABLE 2), wherein the units of the radius of curvature, the thickness and the focal length are expressed in mm, and HFOV is half of the maximum field of view.

Figure 2A:
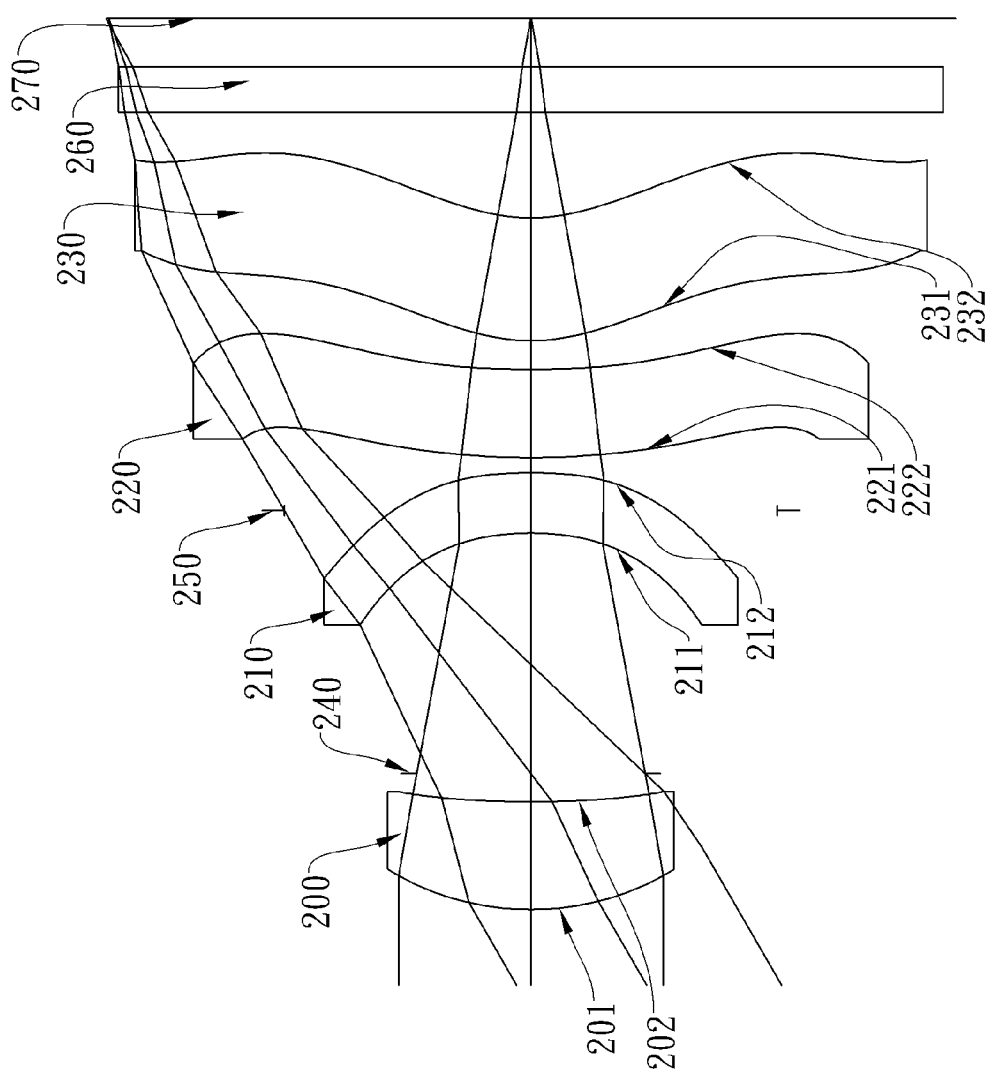
FIG. 2A shows an optical imaging lens assembly in accordance with a second embodiment of the present invention.
Figure 2B:
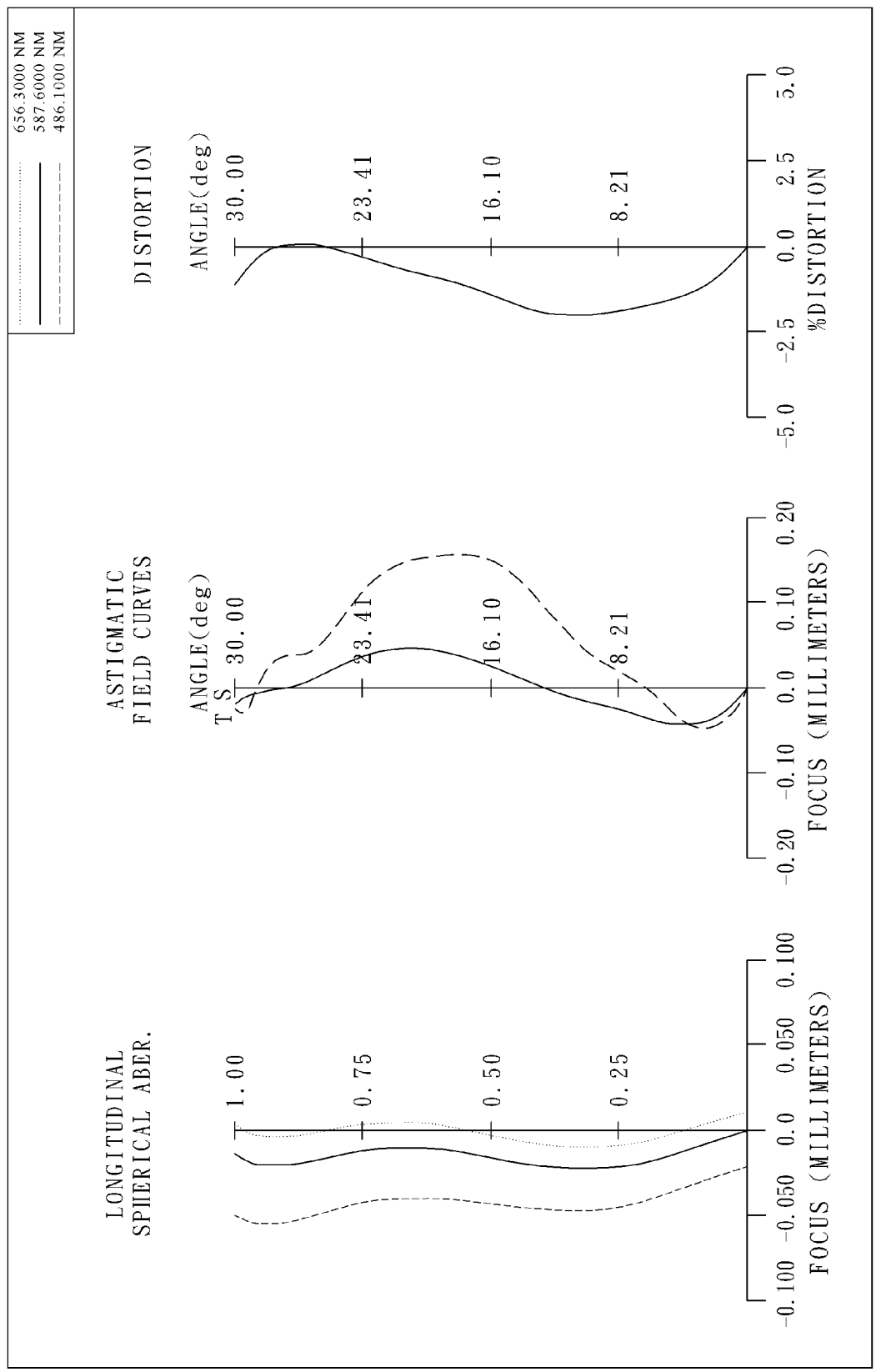
FIG. 2B shows the aberration curves of the second embodiment of the present invention.

FIG. 2A shows an optical imaging lens assembly in accordance with a second embodiment of the present invention, and FIG. 2B shows the aberration curves of the second embodiment of the present invention. The optical imaging lens assembly in the second embodiment mainly comprises four lens elements, in order from an object side to an image side: a glass first lens element 200 with positive refractive power having a convex object-side surface 201 and a concave image-side surface 202, both of the surfaces 201 and 202 being aspheric; a plastic second lens element 210 with negative refractive power having a concave object-side surface 211 and a convex image-side surface 212, both of the surfaces 211 and 212 being aspheric; a plastic third lens element 220 with positive refractive power having a convex object-side surface 221 and a concave image-side surface 222, both of the surfaces 221 and 222 being aspheric; a plastic fourth lens element 230 with positive refractive power having a convex object-side surface 231 and a concave image-side surface 232, both of the surfaces 231 and 232 being aspheric and at least one inflection point being formed on each of the surfaces 231 and 232; an aperture stop 240 disposed between the first lens element 200 and the second lens element 210; a second stop 250 disposed between the second lens element 210 and the third lens element 220. The optical imaging lens assembly also comprises an IR-filter 260 disposed between the image-side surface 232 of the fourth lens element 230 and an image plane 270; the IR-filter 260 is made of glass and has no influence on the focal length of the lens assembly. Further, the optical imaging lens assembly is provided with an electronic sensor disposed at the image plane 270 for the image formation of an object.

The equation of the aspheric surface profiles of the second embodiment has the same form as that of the first embodiment.

In the second embodiment of the present optical imaging lens assembly, the focal length of the lens assembly is f, and it satisfies the relation: f=4.87 (mm).

In the second embodiment of the present optical imaging lens assembly, the f-number of the lens assembly is Fno, and it satisfies the relation: Fno=2.80.

In the second embodiment of the present optical imaging lens assembly, half of the maximum field of view of the lens assembly is HFOV, and it satisfies the relation: HFOV=30.0 (degrees).

In the second embodiment of the present optical imaging lens assembly, the thickness of the third lens element 220 on the optical axis is CT3, the thickness of the fourth lens element 230 on the optical axis is CT4, and they satisfy the relation: CT3/CT4=0.72.

In the second embodiment of the present optical imaging lens assembly, the distance on the optical axis between the first lens element 200 and the second lens element 210 is T12, the focal length of the lens assembly is f, and they satisfy the relation: T12/f=0.37.

In the second embodiment of the present optical imaging lens assembly, the radius of curvature of the object-side surface 221 of the third lens element 220 is R5, the radius of curvature of the image-side surface 222 of the third lens element 220 is R6, and they satisfy the relation: R5/R6=0.38.

In the second embodiment of the present optical imaging lens assembly, the radius of curvature of the object-side surface 231 of the fourth lens element 230 is R7, the radius of curvature of the image-side surface 232 of the fourth lens element 230 is R8, and they satisfy the relation: (R7−R8)*10/(R7+R8)=0.28.

In the second embodiment of the present optical imaging lens assembly, the focal length of the lens assembly is f, the focal length of the first lens element 200 is f1, and they satisfy the relation: f/f1=0.95.

In the second embodiment of the present optical imaging lens assembly, the focal length of the first lens element 200 is f1, the focal length of the second lens element 210 is f2, and they satisfy the relation: f1/f2=−0.93.

In the second embodiment of the present optical imaging lens assembly, the distance on the optical axis between the second stop 250 and the electronic sensor is $LS_2$, half of the diagonal length of the effective pixel area of the electronic sensor is ImgH, and they satisfy the relation: $(ImgH−0.7LS_2)/ImgH=0.21$.

In the second embodiment of the present optical imaging lens assembly, half of the diameter of the second stop 250 is $YS_2$, half of the diagonal length of the effective pixel area of the electronic sensor is ImgH, and they satisfy the relation: $YS_2/ImgH=0.58$.

In the second embodiment of the present optical imaging lens assembly, the distance on the optical axis between the object-side surface 211 of the second lens element 210 and the second stop 250 is $DS_2$, the distance on the optical axis between the object-side surface 211 of the second lens element 210 and the image-side surface 222 of the third lens element 220 is $DL_2$, and they satisfy the relation: $DS_2/DL_2=0.14$.

In the second embodiment of the present optical imaging lens assembly, the distance on the optical axis between the object-side surface 201 of the first lens element 200 and the electronic sensor is TTL, the focal length of the lens assembly is f, and they satisfy the relation: TTL/f=1.19.

In the second embodiment of the present optical imaging lens assembly, the distance on the optical axis between the object-side surface 201 of the first lens element 200 and the electronic sensor is TTL, half of the diagonal length of the effective pixel area of the electronic sensor is ImgH, and they satisfy the relation: TTL/ImgH=2.08.

The detailed optical data of the second embodiment is shown in FIG. 5 (TABLE 3), and the aspheric surface data is shown in FIG. 6 (TABLE 4), wherein the units of the radius of curvature, the thickness and the focal length are expressed in mm, and HFOV is half of the maximum field of view.

It is to be noted that TABLES 1-4 (illustrated in FIGS. 3-6 respectively) show different data of the different embodiments; however, the data of the different embodiments are obtained from experiments. Therefore, any optical imaging lens assembly of the same structure is considered to be within the scope of the present invention even if it uses different data. The preferred embodiments depicted above are exemplary and are not intended to limit the scope of the present invention. TABLE 5 (illustrated in FIG. 7) shows the data of the respective embodiments resulting from the equations.

What is claimed is:

1. An optical imaging lens assembly comprising, in order from an object side to an image side:
   a first lens element with positive refractive power having a convex object-side surface;
   a second lens element having a concave object-side surface;
   a third lens element with positive refractive power;
   a fourth lens element having a convex object-side surface and a concave image-side surface;
   a first stop disposed between the first lens element and the second lens element; and
   a second stop disposed between the second lens element and the fourth lens element;
   wherein the lens assembly is further provided with an electronic sensor for the image formation of an object; a focal length of the first lens element is f1; a focal length of the second lens element is f2; half of a diameter of the second stop is YS; half of a diagonal length of an effective pixel area of the electronic sensor is ImgH; a distance on an optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; and a distance on the optical axis between the object-side surface of the first lens element and the electronic sensor is TTL, they satisfy the following relations:

$f1/f2<0$;

$0.30<YS/ImgH<0.85$;

$-0.3<DS/DL<0.7$;

$0.21<T12/f<0.38$; and $0.30<TTL/f<1.29$.

2. The optical imaging lens assembly according to claim 1, wherein the fourth lens element is made of plastic, at least one of the object-side and image-side surfaces of the fourth lens element is aspheric, and the first stop is an aperture stop.

3. The optical imaging lens assembly according to claim 2, wherein the focal length of the lens assembly is f, the focal length of the first lens element is f1, and they satisfy the following relation:

$0.7<f/f1<1.4$.

4. The optical imaging lens assembly according to claim 3, wherein the focal length of the lens assembly is f, the focal length of the first lens element is f1, and they satisfy the following relation:

$0.9<f/f1<1.1$.

5. The optical imaging lens assembly according to claim 2, wherein a radius of curvature of the object-side surface of the fourth lens element is R7, a radius of curvature of the image-side surface of the fourth lens element is R8, and they satisfy the following relation:

$0.2<(R7-R8)*10/(R7+R8)<0.6$.

6. The optical imaging lens assembly according to claim 5, wherein a radius of curvature of the object-side surface of the third lens element is R5, a radius of curvature of the image-side surface of the third lens element is R6, and they satisfy the following relation:

$0.3<R5/R6<0.4$.

7. The optical imaging lens assembly according to claim 1, wherein the third lens element is made of plastic, at least one of the object-side and image-side surfaces of the third lens element is aspheric, at least one inflection point is formed on at least one of the object-side and image-side surfaces of the fourth lens element, and the first stop is an aperture stop.

8. The optical imaging lens assembly according to claim 7, wherein a thickness of the third lens element on the optical axis is CT3, a thickness of the fourth lens element on the optical axis is CT4, and they satisfy the following relation:

$0.65<CT3/CT4<0.95$.

9. The optical imaging lens assembly according to claim 8, wherein the focal length of the first lens element is f1, the focal length of the second lens element is f2, and they satisfy the following relation:

$-1.3<f1/f2<-0.6$.

10. The optical imaging lens assembly according to claim 1, wherein half of the diameter of the second stop is YS, half of the diagonal length of the effective pixel area of the electronic sensor is ImgH, and they satisfy the following relation:

$0.53<YS/ImgH<0.82$.

11. The optical imaging lens assembly according to claim 10, wherein the distance on the optical axis between the second stop and the object-side surface of the adjacent lens element relative to the object side of the second stop is DS, the distance on the optical axis between the object-side surface of the adjacent lens element relative to the object side of the second stop and the image-side surface of the adjacent lens element relative to the image side of the second stop is DL, and they satisfy the following relation:

$-0.1<DS/DL<0.62$.

12. The optical imaging lens assembly according to claim 11, wherein the distance on the optical axis between the object-side surface of the first lens element and the electronic sensor is TTL, half of the diagonal length of the effective pixel area of the electronic sensor is ImgH, and they satisfy the following relation:

$TTL/ImgH<2.2$.

13. An optical imaging lens assembly comprising, in order from an object side to an image side:
    a first lens element with positive refractive power having a convex object-side surface;
    a second lens element having a concave object-side surface;
    a third lens element with positive refractive power, at least one of the object-side and image-side surfaces thereof being aspheric;
    a fourth lens element having a convex object-side surface and a concave image-side surface, at least one of the object-side and image-side surfaces thereof being aspheric, and at least one inflection point being formed on at least one of the object-side and image-side surfaces thereof;
    a first stop disposed between the first lens element and the second lens element; and
    a second stop disposed between the second lens element and the third lens element;

wherein the lens assembly is further provided with an electronic sensor for the image formation of an object; a focal length of the first lens element is f1; a focal length of the second lens element is f2; a distance on an optical axis between the second stop and the electronic sensor is LS; half of a diameter of the second stop is YS; half of a diagonal length of an effective pixel area of the electronic sensor is ImgH; a distance on an optical axis between the second stop and an object-side surface of an adjacent lens element relative to the object side of the second stop is DS; a distance on the optical axis between the object-side surface of the adjacent lens element relative to the object side of the second stop and an image-side surface of an adjacent lens element relative to the image side of the second stop is DL; a distance on the optical axis between the first lens element and the second lens element is T12; a focal length of the lens assembly is f; and a distance on the optical axis between the object-side surface of the first lens element and the electronic sensor is TTL, they satisfy the following relations:

$f1/f2<0$;

$(ImgH-0.7LS)/ImgH<YS/ImgH<0.82$;

$-0.3<DS/DL<0.7$;

$0.21<T12/f<0.38$; and $0.30<TTL/f<1.29$.

14. The optical imaging lens assembly according to claim 13, wherein the first stop is an aperture stop, half of the diameter of the second stop is YS, half of the diagonal length of the effective pixel area of the electronic sensor is ImgH, and they satisfy the following relation:

$0.5<YS/ImgH<0.7$.

15. The optical imaging lens assembly according to claim 14, wherein a radius of curvature of the object-side surface of the third lens element is R5, a radius of curvature of the image-side surface of the third lens element is R6, and they satisfy the following relation:

$0.3<R5/R6<0.4$.

16. The optical imaging lens assembly according to claim 13, wherein the focal length of the first lens element is f1, the focal length of the second lens element is f2, and they satisfy the following relation:

$-1.3<f1/f2<-0.6$.

* * * * *